United States Patent
Jeon et al.

(10) Patent No.: US 8,711,475 B2
(45) Date of Patent: Apr. 29, 2014

(54) PROJECTION SCREEN AND PROJECTION SYSTEM HAVING THE SAME

(75) Inventors: Wook-jae Jeon, Hwaseong-si (KR); Sang-hyun Sohn, Suwon-si (KR); Jeong-ho Nho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/447,829

(22) Filed: Apr. 16, 2012

(65) Prior Publication Data

US 2013/0050814 A1 Feb. 28, 2013

(30) Foreign Application Priority Data

Aug. 26, 2011 (KR) .................. 10-2011-0086093

(51) Int. Cl.
*G03B 21/56* (2006.01)
*G03B 21/60* (2014.01)
*G03B 21/10* (2006.01)

(52) U.S. Cl.
CPC ............... *G03B 21/56* (2013.01); *G03B 21/60* (2013.01); *G03B 21/10* (2013.01)
USPC .......................................... 359/449; 359/443

(58) Field of Classification Search
USPC .......... 359/443, 449, 453, 456–457, 459–460
See application file for complete search history.

(56) References Cited

U.S. PATENT DOCUMENTS

| | | | | |
|---|---|---|---|---|
| 6,023,369 | A * | 2/2000 | Goto ............................. | 359/443 |
| 7,262,911 | B2 * | 8/2007 | Niwa et al. .................... | 359/459 |
| 7,331,679 | B2 * | 2/2008 | Cho et al. ...................... | 353/78 |
| 7,443,583 | B2 | 10/2008 | Yamauchi | |
| 7,446,915 | B2 * | 11/2008 | Holmes et al. ................. | 359/15 |
| 7,646,536 | B2 * | 1/2010 | Fujita et al. .................... | 359/459 |
| 2005/0180004 | A1 | 8/2005 | Sekiguchi | |
| 2005/0200952 | A1 | 9/2005 | Niwa et al. | |
| 2005/0213001 | A1 * | 9/2005 | Ueki et al. ..................... | 349/113 |
| 2005/0225687 | A1 | 10/2005 | Yamauchi | |
| 2005/0286025 | A1 | 12/2005 | Cho et al. | |
| 2007/0115547 | A1 | 5/2007 | Kuo et al. | |
| 2007/0217004 | A1 | 9/2007 | Smith et al. | |
| 2007/0217005 | A1 * | 9/2007 | Novet et al. ................... | 359/459 |
| 2008/0297895 | A1 * | 12/2008 | Fujita et al. ................... | 359/459 |

FOREIGN PATENT DOCUMENTS

| | | | | |
|---|---|---|---|---|
| EP | 1 288 708 A1 | | 3/2003 | |
| JP | 2005-134448 | * | 5/2006 | ............. G03B 21/60 |
| JP | 2008-26592 A | | 2/2008 | |
| JP | 2008-026592 | * | 7/2008 | ............... G02B 5/08 |
| KR | 10-2005-0011633 A | | 1/2005 | |
| KR | 10-2006-0045551 A | | 5/2006 | |
| KR | 10-0607989 B1 | | 7/2006 | |
| KR | 10-0693330 B1 | | 3/2007 | |

OTHER PUBLICATIONS

Communication dated Dec. 7, 2012, issued by the European Patent Office in counterpart European Application No. 12162603.0.

* cited by examiner

*Primary Examiner* — Clayton E Laballe
*Assistant Examiner* — Kevin Butler
(74) *Attorney, Agent, or Firm* — Sughrue Mion, PLLC

(57) ABSTRACT

A projection screen is provided, which includes a reflective layer having plural reflective patterns which are spaced apart from one another and each of which includes an image reflective surface having an inclination angle against a horizontal direction so as to guide an image light toward a front of the screen, and plural external light absorption layers absorbing external lights incident to the screen.

19 Claims, 8 Drawing Sheets

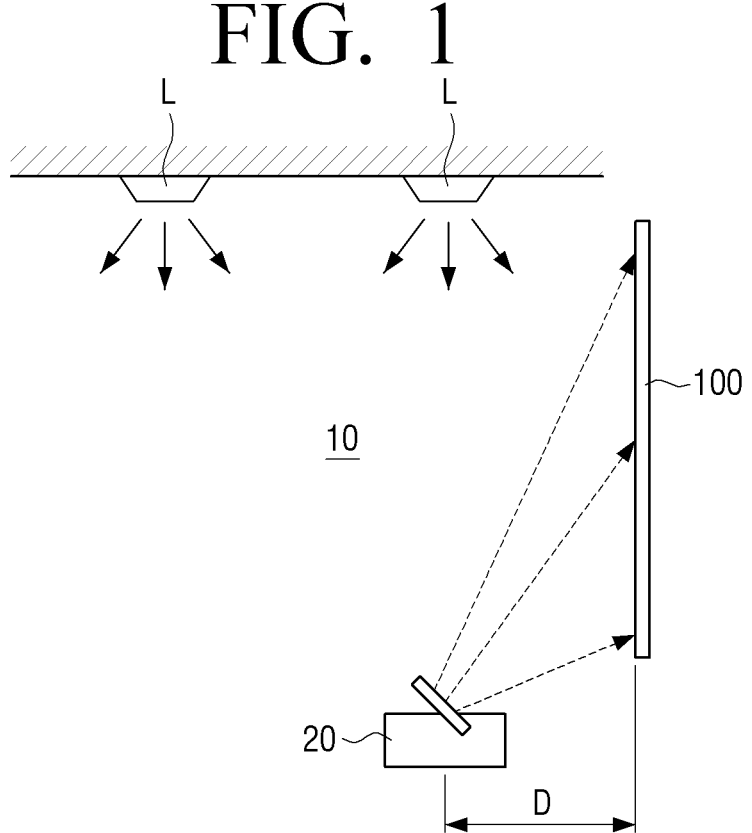

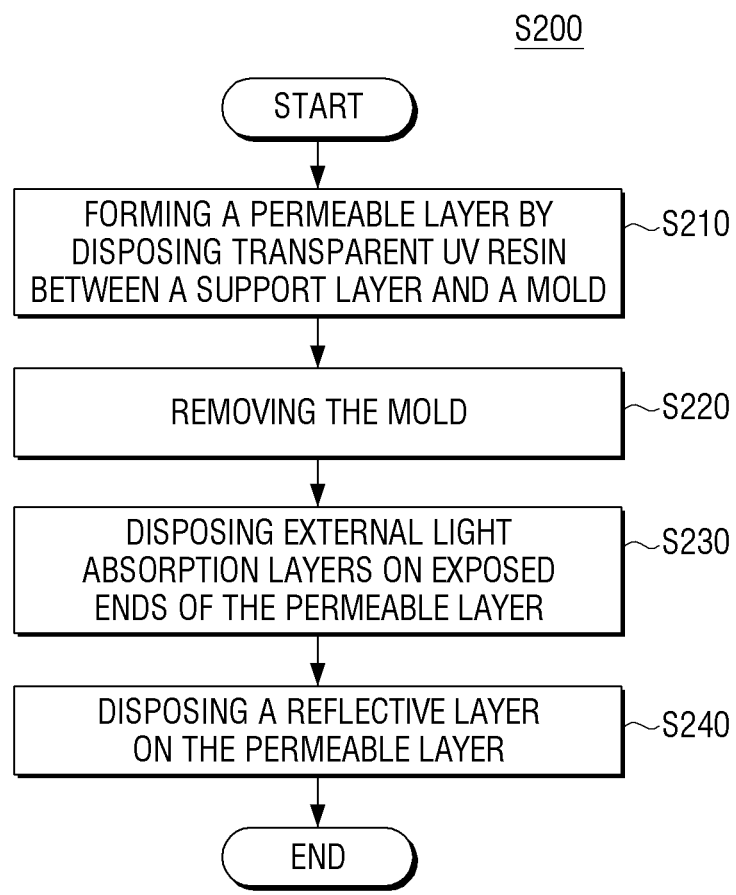

PROJECTION SCREEN AND PROJECTION SYSTEM HAVING THE SAME

CROSS-REFERENCE TO RELATED PATENT APPLICATION

This application claims priority under 35 U.S.C. §119(a) to Korean Patent Application No. 10-2011-0086093, filed on Aug. 26, 2011, in the Korean Intellectual Property Office, the disclosure of which is hereby incorporated herein by reference.

BACKGROUND

1. Field

The exemplary embodiments relate to a projection screen and a projection system having the same, and more particularly to a projection screen that is suitable for a short-throw projector and a projection system having the same.

2. Description of the Related Art

A projection system projects an image onto a screen using a projector and displays the image through a screen.

A short-throw projector has a relatively small throw ratio that is defined as a "projection distance/width of a projected image" in comparison to typical projectors. Accordingly, since the short-throw projector has a relatively short projection distance (distance between a projector and a screen) when in use, an incident angle of an image light against the screen is larger in comparison to that of the typical projectors. As described above, since the incident angle of the image light against the screen is large when the short-throw projector is used, an imbalance of brightness may occur at different positions in the screen.

In the case where the projection system is used in a bright room environment, a part of an external light that is irradiated from an interior lighting fixture such as a ceiling lamp onto the screen may be reflected toward a viewer, and due to the reflected external light, contrast of an image may deteriorate. The deterioration of the contrast may also cause the deterioration of image quality.

SUMMARY

The exemplary embodiments described below may address at least the above problems and/or disadvantages and may provide at least the advantages described below. Accordingly, an aspect of the exemplary embodiments provides a projection screen and a projection system having the same, which can solve an imbalance of brightness due to the use of a short-throw projector and improve the deterioration of contrast due to an external light.

According to one aspect of the exemplary embodiments, a projection screen for displaying an image projected from a projector includes a reflective layer having plural reflective patterns which are spaced apart from one another and each of which includes an image reflective surface having an inclination angle against a horizontal direction so as to guide an image light toward a front of the screen; and plural external light absorption layers absorbing external lights incident to the screen.

The reflective layer may have plural absorption layer seating surfaces on which the external absorption layers are seated, and the respective absorption layer seating surfaces may be arranged between two adjacent reflective patterns.

The absorption layer seating surfaces may be extended along a vertical direction.

The absorption layer seating surfaces may be arranged on a common vertical plane.

Each of the reflective patterns may further include a first external light reflective surface formed on an upper side of the reflective pattern to guide the external light toward the absorption layer seating surface; and a second external light reflective surface formed on a lower side of the reflective pattern to guide the external light toward the absorption layer seating surface.

The first external light reflective surface of any one reflective pattern and the second external light reflective pattern of another reflective pattern that is arranged on the upper side of the reflective pattern may form external light guide channels that guide the external light, which is incident to the first external light reflective surface, toward the absorption layer seating surface.

The first external light reflective surface and the second external light reflective surface may be extended along the horizontal direction.

An external light absorption layer may be additionally formed on the first external light reflective surface.

An external light absorption layer may be additionally formed on the second external light reflective surface.

The image reflective surface of any one reflective pattern may have the inclination angle that is larger than the inclination angle of the image reflective surface of another reflective pattern arranged on an upper side.

The inclination angle of the image reflective surface may be in the range of 45 degrees to 90 degrees.

The plural reflective patterns may be extended along plural concentric circles which can be seen on the front of the screen.

The plural reflective patterns may be extended along plural horizontal straight lines which can be seen on the front of the screen.

The external light absorption layer may have black color.

The projection screen according to an exemplary embodiment may further include a support layer; and a permeable layer supported by the support layer disposed between the support layer and the reflective layer.

The support layer and the permeable layer may have a transparent material.

The external light absorption layers may be formed on surfaces of end portions of the permeable layer.

The support layer may include a diffusion material.

According to another aspect of the exemplary embodiments, a projection system includes a screen and a projector projecting an image onto the screen, wherein the screen includes a reflective layer having plural reflective patterns which are spaced apart from one another and each of which includes an image reflective surface having an inclination angle against a horizontal direction so as to guide an image light toward a front of the screen; and plural external light absorption layers absorbing external lights incident to the screen.

The projector may be a short-throw projector arranged in a position that is 0.2 m to 0.5 m apart from the screen.

BRIEF DESCRIPTION OF THE DRAWINGS

The above and other aspects, features and advantages of the exemplary embodiments will be more apparent from the following detailed description when taken in conjunction with the accompanying drawings, in which:

FIG. 1 is a side view schematically illustrating a projection system according to an exemplary embodiment;

FIG. 7 is a flow chart illustrating an exemplary method for manufacturing the screen of FIG. 4.

DETAILED DESCRIPTION OF EXEMPLARY EMBODIMENTS

Hereinafter, exemplary embodiments will be described in detail with reference to the accompanying drawings.

Figure 2A:
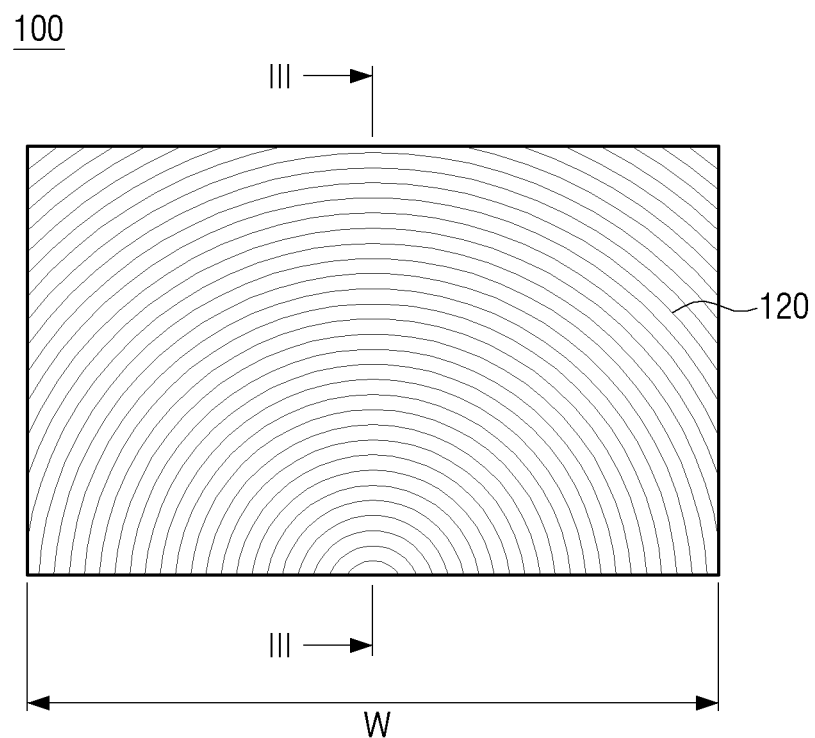
FIG. 2A is a schematic front view of a screen provided in the projection system of FIG. 1.
Figure 2B:
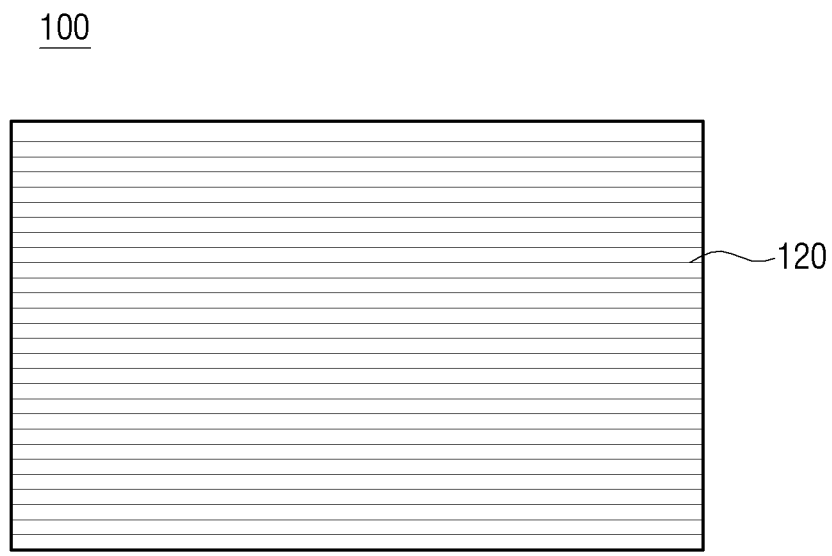
FIG. 2B is a front view illustrating an alternative example of the screen of FIG. 2A.

FIG. 1 is a side view schematically illustrating a projection system according to an exemplary embodiment, FIG. 2A is a schematic front view of a screen provided in the projection system of FIG. 1, and FIG. 2B is a front view illustrating an alternative example of the screen of FIG. 2A.

Referring to FIGS. 1 and 2A, a projection system 10 according to an exemplary embodiment includes a projector 20 and a screen 100.

The projector 20 projects a moving image or a still image toward the screen 100. The throw ratio of the projector 20 may be defined as "a distance D between the projector 20 and the screen 100" against "a width W of the screen 20". That is, the throw ratio of the projector 20 is defined as D/W. The projector 20 of FIG. 1 has a relatively small throw ratio in comparison to typical projectors. The projector 20 of FIG. 1 is a "short-throw projector" having a throw ratio of a relatively small value. For example, when the screen 100 has a width W of 100 inches, the distance D between the projector 20 and the screen 100 may be 0.2 m to 0.5 m.

Since the projector 20 is the short-throw projector, an incident angle of an image light that is incident from the projector 20 to the screen 100 is larger than that of typical projectors. As the incident light of the image light becomes stronger, an imbalance of brightness of an image that is displayed on the screen 20 may become deeper. For example, since the incident angle of the image light becomes larger on an upper side of the screen 20, the image becomes darker on the upper side of the screen 20.

On the other hand, as illustrated in FIG. 1, if a lighting fixture such as a ceiling lamp L is turned on in a place where the projection system 10 is used, that is, if the projection system 10 is used in a bright room environment, external light may be irradiated onto the screen 100 together with the image light. The external light that is irradiated onto the screen 100 may deteriorate the contrast of the image.

The screen 100 displays the image that is projected by the projector 20 toward a viewer (that is, toward the front). As illustrated in FIG. 2A, plural patterns 120 for improving the imbalance of brightness that is caused by the use of the short-throw projector are provided on a front surface of the screen 100. Such plural patterns 120 are formed along plural concentric circles as illustrated in FIG. 2A. For reference, such a shape is generally called a "Fresnel" shape. Alternatively, as illustrated in FIG. 2B, the plural patterns 120 may be formed along plural horizontal straight lines.

Figure 3:
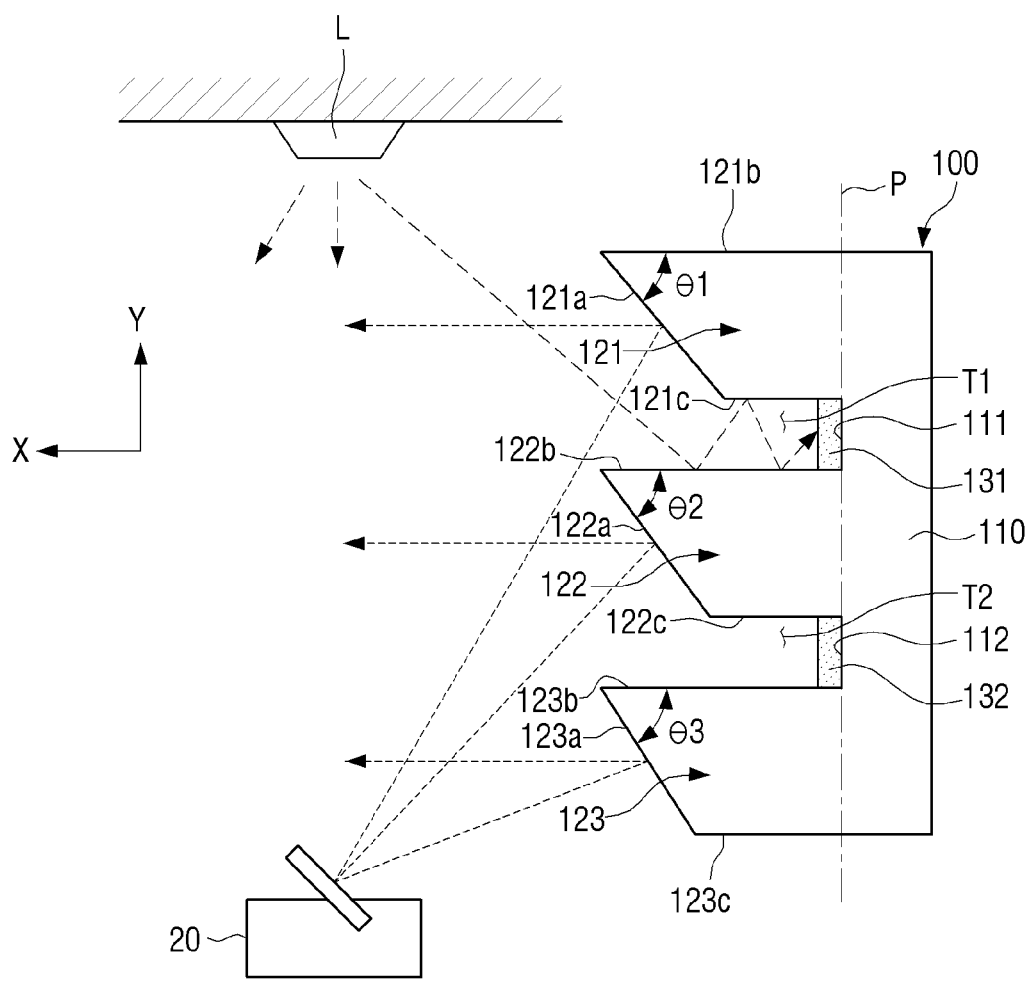
FIG. 3 is a partially expanded cross-sectional view taken along line III-III of FIG. 2A.

Referring to FIG. 3, the above-described screen 100 will be described in more detail. FIG. 3 is a partially expanded cross-sectional view taken along line III-III of FIG. 2A.

Referring to FIG. 3, the screen 100 includes a reflective layer 110 and plural external light absorption layers 131 and 132.

The reflective layer 110, for example, may be made of aluminum. Further, the reflective layer 110 has plural reflective patterns 121 to 123 as described above. As illustrated in FIG. 3, the reflective patterns 121 to 123 are arranged to be spaced apart from one another at equal intervals.

Each of the reflective patterns includes an image reflective surface, a first external light reflective surface and a second external light reflective surface. That is, the reflective pattern 121 includes an image reflective surface 121a, a first external light reflective surface 121b, and a second external light reflective surface 121c. The reflective pattern 122 includes an image reflective surface 122a, a first external light reflective surface 122b, and a second external light reflective surface 122c. The reflective pattern 123 includes an image reflective surface 123a, a first external light reflective surface 123b, and a second external light reflective surface 123c.

Here, the image reflective surfaces 121a, 122a, and 123a guide the image light projected from the projector 20 to the front of the screen 100 (that is, in X direction) by reflecting and diffusing the image light. For this, the image reflective surfaces 121a, 122a, and 123a have inclination angles Θ1, Θ2, and Θ3 that are inclined against the horizontal direction (X direction). The inclination angles Θ1, Θ2, and Θ3 of the image reflective surfaces 121a, 122a, and 123a are preferably in the range of 45 degrees to 90 degrees.

Further, the inclination angle of the image reflective surface of one reflective pattern may be larger than the inclination angle of the image reflective surface of another reflective pattern. For example, the inclination angle Θ2 of the image reflective surface 122a may be larger than the inclination angle Θ1 of another image reflective surface 121a that is positioned on an upper side. In the same manner, the inclination angle Θ3 of the image reflective surface 123a may be larger than the inclination angle Θ2 of another image reflective surface 122a that is positioned on an upper side. In other words, the inclination angle of the image reflective surface may become gradually larger (that is, Θ1<Θ2<Θ3) as the position of the image reflective surface becomes lower. Through the change of the inclination angles Θ1, Θ2, and Θ3, the image lights that are incident to the image reflective surfaces 121a, 122a, and 123a can be guided to the front with substantially the same directivity regardless of the size of the incident angle (that is, regardless of the size of the screen).

As the image lights are guided in the same direction (X direction) regardless of the size of the incident angle, the imbalance of brightness according to the position of the screen 100 can be improved.

The first external light reflective surfaces 121b, 122b, and 123b are formed on the upper side of the reflective patterns 121, 122, and 123, and the second external light reflective surfaces 121c, 122c, and 123c are formed on the lower side of the reflective patterns 121, 122, and 123. Further, the first external light reflective surfaces 121b, 122b, and 123b and the second external light reflective surfaces 121c, 122c, and 123c are extended along the horizontal direction (X direction).

The first external light reflective surface of one reflective pattern and the second external light reflective surface of another reflective pattern that is arranged on the upper side of the reflective pattern form external light guide channels T1 and T2. For example, the first external light reflective surface 122b of the reflective pattern 122 and the second external light reflective surface 121c of the reflective pattern 121 that is arranged on the upper side thereof form the external light guide channel T1, and the first external reflective surface 123b of the reflective pattern 123 and the second external light reflective surface 122c of the reflective pattern 122 that is arrange on the upper side thereof form the external light guide channel T2.

Accordingly, the external light that is incident from the interior lighting fixture such as a ceiling lamp L to the screen 100 can be guided toward the external light absorption layers 131 and 132 along the external light guide channels T1 and T2. For example, if an external light is incident from the ceiling lamp L to the first external light reflective surface 122b of the reflective pattern 122, the incident external light is reflected by the first external light reflective surface and the second external light reflective surface 121c of the adjacent reflective pattern 121, and is guided to the external light absorption layer 131 along the external light guide channel T1.

The external light absorption layers 131 and 132 are arranged between the above-described reflective patterns 121, 122, and 123. For example, the external light absorption layer 131 is arranged between two adjacent reflective patterns 121 and 122, and the external light absorption layer 132 is arranged between two adjacent reflective patterns 122 and 123.

More specifically, the external light absorption layers 131 and 132 are seated on the absorption layer seating surfaces 111 and 112 provided on the reflective layer 110. One absorption layer seating surface is formed between the adjacent reflective patterns. For example, the absorption layer seating surface 111 is formed between the two adjacent reflective patterns 121 and 122. The absorption layer seating surfaces 111 and 112 are arranged in the deepest position of the above-described external light guide channels T1 and T2, and are extended along the vertical direction (that is, Y direction). Further, as illustrated in FIG. 3, since the plural absorption layer seating surfaces 111 and 112 have the same depth, they are arranged on a common plane P that follows the vertical direction. Accordingly, the external light absorption layers 131 and 132 that are arranged on the absorption layer seating surfaces 111 and 112 are also arranged on a common plane P that follows the vertical direction.

External light absorption layers 131 and 132 may have a black color that facilitates the light absorption. For example, the external light absorption layers 131 and 132 may be made with black ink. Accordingly, the external lights that are guided along the external light guide channels T1 and T2 can be absorbed into the external light absorption layers 131 and 132. Since a considerable part of the external light that is irradiated toward the screen 100 is absorbed into the external light absorption layers 131 and 132, the contrast deterioration due to the external light that is reflected (or diffused) to the front by the screen 100 can be improved.

On the other hand, part of the light that is irradiated from the interior lighting fixture such as a ceiling lamp L to the screen 100 may also be reflected by the image reflective surfaces 121a, 122a, and 123a of the reflective patterns. However, since the image reflective surfaces 121a, 122a, and 123a have the inclination angles Θ1, Θ2, and Θ3 against the horizontal direction, the external lights reflected from the image reflective surfaces 121a, 122a, and 123a do not propagate along the X direction, but are substantially guided toward the interior floor, and thus almost no effect is exerted on the contrast of the image.

As illustrated in FIG. 3, the external light absorption layers 131 and 132 are arranged on the absorption layer seating surfaces 111 and 112. However, in other alternative embodiments, the external light absorption layers may be additionally provided on the first external light reflective surfaces 121b, 122b, and 123b, and/or may be additionally provided on the second external light reflective surfaces 121c, 122c, and 123c. Since the external light absorption layers are additionally provided on the first external light reflective surfaces 121b, 122b, and 123b and/or the second external light reflective surfaces 121c, 122c, and 123c, the external light absorption ratio of the screen 100 can be further increased, and thus the contrast can be further improved.

Figure 4:
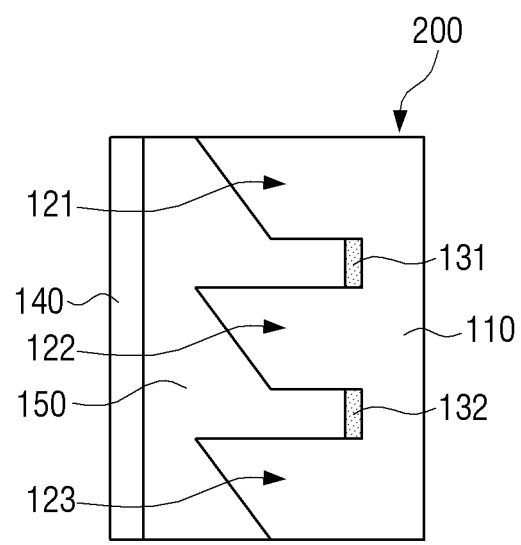
FIG. 4 is a view similar to FIG. 3, and is a partially expanded cross-sectional view illustrating a screen according to another exemplary embodiment.

FIG. 4 is a view similar to FIG. 3, and is a partially expanded cross-sectional view illustrating a screen according to another exemplary embodiment.

Referring to FIG. 4, a screen 200 according to another exemplary embodiment includes a reflective layer 110, external light absorption layers 131 and 132, a support layer 140, and a permeable layer 150.

The reflective layer 110 and the external light absorption layers 131 and 132 are the same as those of the screen 100 according the exemplary embodiment as described above with reference to FIG. 3. Accordingly, duplicate explanation of the reflective layer 110 and the external light absorption layers 131 and 132 will be omitted.

The support layer 140 supports the permeable layer 150, and is made of a transparent material (for example, transparent polymer resin) so that the image light can reach the reflective layer 110. The support layer 140 may include a diffusion material so as to diffuse the image light reflected from the reflective layer 110. Due to the diffusion function of the support layer 140, wider viewing angle can be secured.

The permeable layer 150 is arranged between the reflective layer 110 and the support layer 140. In the same manner as the support layer 140, the permeable layer 150 may be made of a transparent material (for example, transparent polymer) so that the image light can reach the reflective layer 110. For example, the permeable layer 150 may be made of transparent UV resin.

Figure 6:
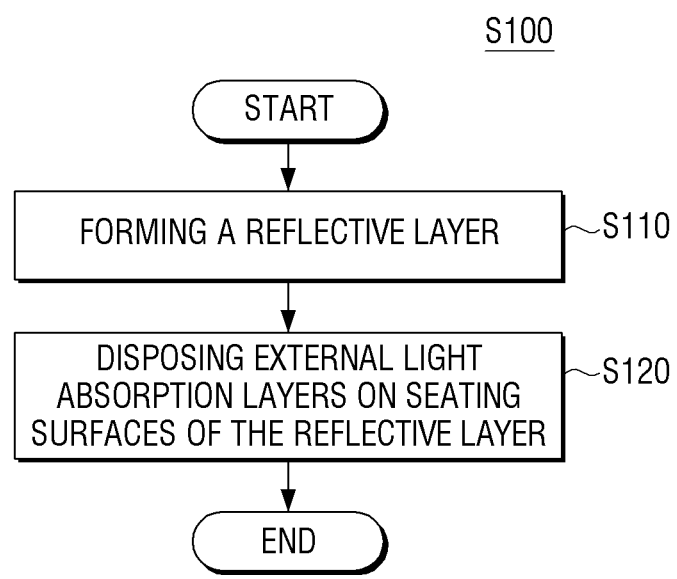
FIG. 6 is a flow chart illustrating an exemplary method for manufacturing the screen of FIG. 3.

Referring to FIGS. 3 and 6, a method of manufacturing a screen 100 of FIG. 4 will be described. Here, FIG. 6 is a flow chart illustrating an exemplary method for manufacturing the screen 100 of FIG. 3.

Firstly, a reflective layer (110) is formed (S110). As described above, the reflective layer (110) includes the image reflective surfaces 121a, 122a, and 123a. The surfaces 121a, 122a, and 123a have inclination angles Θ1, Θ2, and Θ3 that are inclined against the horizontal direction (X direction) for guiding an image light to the front of the screen 100.

Secondly, an external light absorption layers 131 and 132 are disposed on seating surfaces 111 and 112 of the reflective layer 110 to finish the manufacturing of the screen 100 (S120).

Figure 5A:
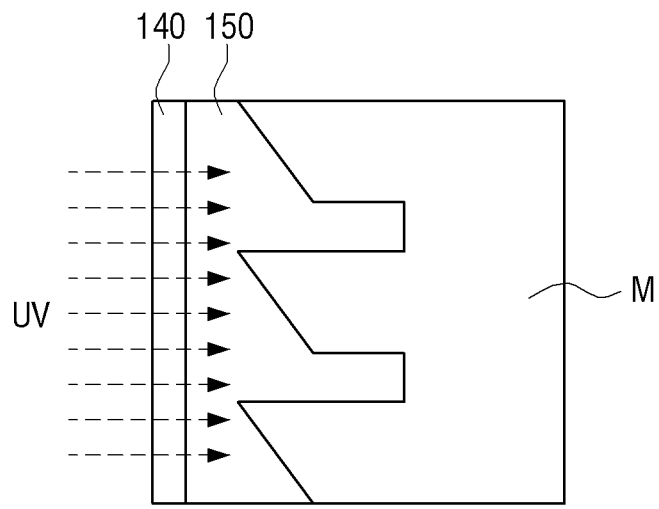
FIGS. 5A to 5C are schematic cross-sectional views sequentially illustrating processes for manufacturing the screen illustrated in FIG. 4.
Figure 5B:
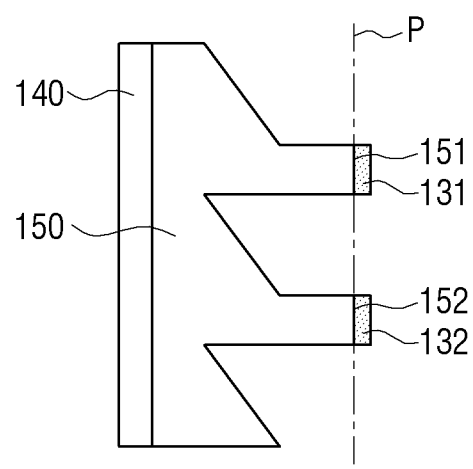
Figure 5C:
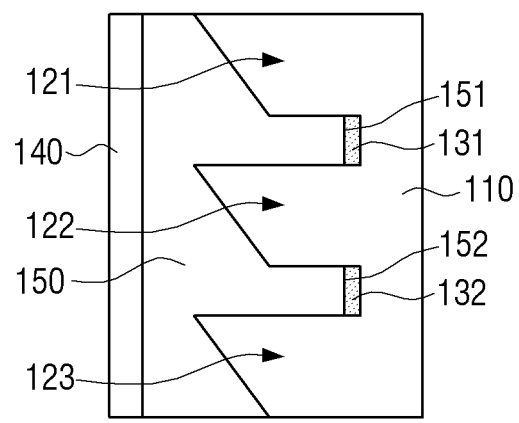

Referring to FIGS. 5A to 5C and 7, a method of manufacturing a screen 200 of FIG. 4 will be described. FIGS. 5A to 5C are schematic cross-sectional views sequentially illustrating processes for manufacturing the screen illustrated in FIG. 4 and FIG. 7 is a flow chart illustrating a exemplary method for manufacturing the screen 200 of FIG. 4.

Referring to FIG. 5A, after filling transparent UV resin between a support layer 140 and a mold M, a permeable layer 150 is formed by hardening the UV resin through irradiation of UV rays onto the UV resin (S210). Alternatively, the permeable layer 150 may be formed in a heat transfer method using the mold M.

Referring to FIG. 5B, after removing the mold M (S220), external light absorption layers 131 and 132 are formed by spreading black ink on exposed end portion surfaces 151 and 152 of the permeable layer 150 (S230). As illustrated in FIG. 5B, the end portion surfaces 151 and 152 of the permeable layer 150 are arranged on a common vertical plane P, and thus the spreading process of the external light absorption layers 131 and 132 can be easily performed.

For example, in the case of spreading the external light absorption layers 131 and 132 in a roll printing method, the external light absorption layers 131 and 132 can be printed in a single printing process since the end portion surfaces 151 and 152 of the permeable layer 150 are arranged on a common vertical plane P. In other words, if the end portion surfaces 151 and 152 of the permeable layer 150 are not arranged on one plane, it may be difficult to perform the spreading process of the external light absorption layers 131 and 132 at once.

Referring to FIG. 5C, after forming the external light absorption layers 131 and 132, a reflective layer 110 is coated on the permeable layer 150 to finish the manufacturing of the screen 200 (S240). As a material of the reflective layer 110, for example, aluminum may be used. Since the permeable layer 110 is formed using the mold M that has a shape corresponding to the reflective layer 110, the reflective layer 110 has the shape that corresponds to the shape of the mold M.

As illustrated in FIG. 5B, the external light absorption layers 131 and 132 are spread on the end portion surfaces 151 and 152 of the permeable layer 150. Unlike this, in other alternative embodiments, in the case where the external light absorption layers 131 and 132 are spread on the absorption layer seating surfaces 111 and 112 of the reflective layer 110, the permeable layer 150 may be omitted. In this case, the support layer 140 that supports the permeable layer 150 may also be omitted.

While the disclosure has been shown and described with reference to certain exemplary embodiments thereof, it will be understood by those skilled in the art that various changes in form and detail may be made therein without departing from the spirit and scope of the inventive concept, as defined by the appended claims.

What is claimed is:

1. A projection screen for displaying an image projected from a projector comprising:
   a reflective layer having a plurality of reflective patterns which are spaced apart from one another, wherein each of the plurality of reflective patterns includes an image reflective surface having an inclination angle against a horizontal direction which guides an image light toward a front of the screen; and
   a plurality of external light absorption layers which absorb external lights incident to the screen,
   wherein the reflective layer has a plurality of absorption layer seating surfaces on which the external absorption layers are disposed, and
   wherein each of the plurality of the absorption layer seating surfaces is arranged in a space disposed between and separating a base of two adjacent reflective patterns.

2. The projection screen as claimed in claim 1, wherein the plurality of absorption layer seating surfaces extend along a vertical direction.

3. The projection screen as claimed in claim 2, wherein the plurality of absorption layer seating surfaces are arranged on a common vertical plane.

4. The projection screen as claimed in claim 1, wherein each of the plurality of reflective patterns further comprises:
   a first external light reflective surface formed on an upper side of each of the plurality of reflective patterns which guides the external light toward the absorption layer seating surface; and
   a second external light reflective surface formed on a lower side of each of the plurality the reflective patterns which guides the external light toward the absorption layer seating surface.

5. The projection screen as claimed in claim 4, wherein the first external light reflective surface and the second external light reflective surface form an external light guide channel that guides the external light toward one absorption layer seating surface of the plurality of absorption layer seating surfaces.

6. The projection screen as claimed in claim 4, wherein the first external light reflective surface and the second external light reflective surface extend along the horizontal direction.

7. The projection screen as claimed in claim 4, wherein an external light absorption layer is additionally disposed on the first external light reflective surface.

8. The projection screen as claimed in claim 4, wherein an external light absorption layer is additionally disposed on the second external light reflective surface.

9. The projection screen as claimed in claim 1, wherein the inclination angle of the image reflective surface of any one of the plurality of reflective patterns is larger than the inclination angle of the image reflective surface of another reflective pattern arranged above it.

10. The projection screen as claimed in claim 1, wherein the inclination angle of the image reflective surface is in the range of 45 degrees to 90 degrees.

11. The projection screen as claimed in claim 1, wherein the plurality of reflective patterns extend along a plurality of concentric circles seen from the front of the screen.

12. The projection screen as claimed in claim 1, wherein the plurality of reflective patterns are extend along a plurality of horizontal straight lines seen from the front of the screen.

13. The projection screen as claimed in claim 1, wherein the plurality of external light absorption layers have a black color.

14. The projection screen as claimed in claim 1, further comprising:
   a support layer; and
   a permeable layer supported by the support layer and disposed between the support layer and the reflective layer.

15. The projection screen as claimed in claim 14, wherein the support layer and the permeable layer are made of a transparent material.

16. The projection screen as claimed in claim 14, wherein the plurality of external light absorption layers are formed on end surfaces of end portions of the permeable layer.

17. The projection screen as claimed in claim 14, wherein the support layer includes a diffusion material.

18. A projection system including a screen and a projector projecting an image onto the screen, wherein the screen comprises:
   a reflective layer having a plurality of reflective patterns which are spaced apart from one another, wherein each of the plurality of reflective patterns includes an image reflective surface having an inclination angle against a horizontal direction which guides an image light toward a front of the screen; and
   a plurality of external light absorption layers which absorb external lights incident to the screen,
   wherein the reflective layer has a plurality of absorption layer seating surfaces on which the external absorption layers are disposed, and
   wherein each of the plurality of the absorption layer seating surfaces is arranged in a space disposed between and separating a base of two adjacent reflective patterns.

19. The projection system as claimed in claim 18, wherein the projector is a short-throw projector positioned 0.2 m to 0.5 m apart from the screen.

\* \* \* \* \*